| United States Patent [19] | [11] Patent Number: 4,983,014 |
| Nattermann | [45] Date of Patent: Jan. 8, 1991 |

[54] BUNDLE OF OPTICAL FIBERS FOR TRANSMISSION OF ELECTROMAGNETIC RADIATION OF HIGH LUMINOUS INTENSITY

[75] Inventor: Kurt Nattermann, Ingelheim, Fed. Rep. of Germany

[73] Assignee: Schott Glaswerke, Mainz, Fed. Rep. of Germany

[21] Appl. No.: 422,488

[22] Filed: Oct. 17, 1989

[30] Foreign Application Priority Data

Oct. 17, 1988 [DE] Fed. Rep. of Germany ....... 3835325

[51] Int. Cl.$^5$ .................................................. G02B 6/04
[52] U.S. Cl. .............................. 350/96.24; 350/96.25
[58] Field of Search ........................... 350/96.24, 96.25

[56] References Cited

U.S. PATENT DOCUMENTS

| 3,395,994 | 10/1964 | Cuff | 350/96.24 X |
| 3,917,383 | 11/1975 | Cook et al. | 350/96.22 |
| 3,981,706 | 9/1976 | Strack | 350/96.26 X |
| 4,330,173 | 5/1982 | Johson et al. | 350/96.16 |

*Primary Examiner*—John D. Lee
*Assistant Examiner*—Phan T. Heartney
*Attorney, Agent, or Firm*—Millen, White & Zelano

[57] ABSTRACT

A fiber bundle is provided for the transmission of high-power electromagnetic radiation, especially power lasers, wherein with a minimum expenditure of material, the radiation can be transmitted without substantial impairment in beam quality (in the beam product). Formulae are set forth for calculating the thickness of the fiber bundle, the numerical aperture, as well as the core and cladding thicknesses of the individual fibers.

26 Claims, No Drawings

BUNDLE OF OPTICAL FIBERS FOR TRANSMISSION OF ELECTROMAGNETIC RADIATION OF HIGH LUMINOUS INTENSITY

BACKGROUND OF THE INVENTION

The invention relates in general to the transmission of electromagnetic radiation and, more particularly, to the transmission of such radiation of high luminous intensity through a bundle of optical fibers.

PRIOR ART

For many technical uses, high-power sources of electromagnetic radiation, i.e., lasers, are utilized, for example, Nd:YAG, Nd:glass, metal vapor, and excimer lasers. The radiant power of continuously operating lasers can range in the kW area and thereabove; in case of pulsed lasers, peak output is often in a range above 100 kW, frequently even in a range far above 1 MW. The beam quality of lasers having a high radiant power is poor in most cases. The beam quality of a laser is characterized by the beam product, i.e. the product from the diameter of the laser beam in mm at the output of the laser times the full angular divergence in rad. A high beam product is equivalent to poor beam quality. For the radiation at the output of a laser of high power, values of 1 mm to 100 mm are typical for the beam diameter, and values of 0.001 rad to 0.1 rad are typical for the full angular divergence of the radiation. In special cases, the values for the diameter and angular divergence can, however, also lie far above these numbers. Values in the range from 0.02 to 0.2 rad·mm are typical for the beam product of lasers of high output; in case of metal vapor lasers, the values can range even far above 0.2 rad·mm.

Another crucial magnitude for characterizing radiation is the luminous intensity. In case of a beam which is rotationally symmetrical with respect to the beam axis, the luminous intensity of the radiation is given by $L = P/(\theta \cdot D)^2$ wherein P is the peak power (or pulse peak power) of the radiation, $\theta$ is the full angular divergence of the radiation in rad, and D is the diameter of the beam in mm, in each case measured at the outlet of the radiation source. In the more general case of a beam that is not rotationally symmetrical wherein the chord (or the "diameter") of the beam and/or the angular divergence of the radiation depends on the angle $\phi$ perpendicular to the beam axis, the angular integral $$\frac{1}{\pi} \int_0^\pi d\phi \, \theta^2(\phi) \cdot D^2(\phi)$$

wherein $\theta(\phi)$ means the full angular divergence of the radiation at the output of the radiation source in dependence on the angle $\phi$, and $D(\phi)$ means the chord (or diameter) passing through the apex of the angle $\phi$ at the output of the radiation source in dependence on the angle $\phi$, takes the place of $(\theta \cdot D)^2$ in the formula for the luminous intensity $L = P/(\theta D)^2$. As compared to the "normal" light sources, lasers typically exhibit high luminous intensities of above $10^5$ W/(rad·mm)$^2$, in most cases even above $10^6$ W/(rad·mm)$^2$.

Frequently, flexible (bendable or articulate) beam guidance systems are required for transmitting the radiation. A technically usable beam guide system should have the following properties:

a high optical destruction threshold (or maximally transmittable radiant power),
a low mechanical resistance to deformation by bending or kinking, and a low bottom limit for the bending radius and/or a high limiting angle for kinks,
no impairment of beam quality due to transmission,
a high transmission efficiency,
good mechanical stability and, which in most cases is tantamount thereto, the use of a minimum number of optical and mechanical components.

The beam guide systems can be mirror-coupled optics and fiber systems

Mirror-coupled optics are distinguished by a high destruction threshold, high transmission efficiency and good beam quality (e.g.: G. Hohberg: "Beam Delivery Systems for High Power Lasers", Proc. SPIE, vol. 650: 118-122, 1980). Their low flexibility and complicated mechanical structure, the vulnerability of the many mechanical and optical components, and the high adjustment effort required are, however, substantial drawbacks. Fiber systems consist of less components and therefore the effort of adjustment needed in case of fiber systems are generally substantially less than in case of the mirror-coupled optics; their flexibility can be better than that of the mirror-coupled optics, and the transmission efficiency can likewise be high. For this reason, fiber systems are generally preferred.

The conventional fiberoptic systems for transmitting high radiation power consist of only one fiber (for example: H. P. Weber and W. Hodel: "High Power Light-Transmission in Optical Waveguides", Proc. SPIE, vol. 650 : 102-108, 1980). These fiberoptic systems, however, frequently cannot meet the requirements for a beam guidance system for high radiation outputs (for example: R. Ringelhan, H. Kar, J. Helfmann, K. Dörschel and G. Müller: "Lightguides for Medical Purposes", Lasers and Optoelectronics, 20 : 44–48, 1988).

If the fiberoptic system is to be flexible (low mechanical resistance against bending, low danger of breakage), the diameter of the fiber must be at a minimum. Besides, its diameter must be small so that there are no excessive radiant losses upon bending of the fibers. However, the requirement of a small fiber diameter is in contradistinction to the other desired fiber properties:

(a) In order to avoid damage by excessive radiation intensities in the fiber core or on the coupling surface, the diameter of the fiber must be relatively large.

(b) Radiation can be "trapped" by a fiber and transmitted over relatively large distances only if the product of the numerical aperture of the fiber and its diameter is at least twice as large as the beam product of the radiation. This can result in a requirement for large fiber diameters.

Thus, in individual fibers there are close interrelationships between the power to be transmitted, the beam product, the required bending radius, and the diameter, considerably narrowing down the freedom of design of such a transmission system.

The use of fiber bundles has been known for the transmission of electromagnetic radiation of low power, especially in image or signal transmission. The peak outputs arising in this case are smaller than 1 kW, frequently even smaller than 1 W, or, respectively, the luminous intensities are smaller than $10^4$ W/(rad·mm)$^2$, but certainly smaller than $10^5$ W/(rad·mm)$^2$. At these low powers, the damage threshold values of the fiber bundles are of no import, and for this reason it is possible to utilize readily processable "low-melting" multi-component glasses and even synthetic resins. In case of low power, radiant losses likewise exhibit lower significance, therefore materials can be utilized having relatively high attenuation values. Furthermore, in most cases, for the typical applications, the quality of the transmitted radiation is negligibel (Schott Information 3/1987, Mains, 1987), and for this reason there is no optimization of the fiber bundles. The input coupling optimization or adaptation of the fiber bundles to radiation sources aims at "capturing" a maximum amount of the radiant power of the radiation source — thus the objective resides in most cases to produce fiber bundles having a maximally high numerical aperture.

For laser radiation with high power, peak outputs of more than 100 kW and luminous intensities of higher than $10^6$ W/(rad·mm)$^2$ are typical. In these instances, the damage threshold values of the fibers or fiber bundles and the losses must be taken into account. Furthermore, at high outputs, the quality of the radiation has great importance for the practical applications.

U.S. Pat. No. 4,690,500 describes how fiber bundles of silica glass are to be optimized for image transmission. However, for transmitting radiation of high power these fibers bundles are useless.

Fiber bundles for the transmission of high radiant outputs are known per se, but exhibit very poor beam qualities, i.e. the beam product of the radiation exiting from the fiber bundle is strongly increased as compared with the beam product of the original radiation. For this reason, they have not been accepted in practical use. The fibers employed are preferably cylindrical staggered-profile fibers. These fibers have a cylindrical core of the diameter $D_k$ surrounded by a cladding having the diameter $D_m$ which, at least in the layer immediately encompassing the core, has a lower optical refractive index than the core and which is optionally additionally surrounded by a protective sheath. Deviations from this structure, especially with respect to the refractive index profile and fiber cross section (e.g., hexagonal cross sections) are considered to be included. Preferably, the core and the cladding of the fibers consist of pure or doped silica glass. Preferably, the core consists of pure silica glass and the cladding and/or the cladding layer immediately surrounding the core consists essentially of fluorine-doped silica glass. It is possible in these fibers to obtain, for radiation in the near ultraviolet to near infrared spectral region, low attenuation values, low threshold values for nonlinear optical effects, and high destruction thresholds. The manufacture of the fibers is conventional, and corresponding fibers and fiber preforms are commercially obtainable.

By combining a plurality of individual fibers, the fiber bundle is obtained. Fiber bundles having damage threshold values of up to 2 MW/mm$^2$, are usual; with laboratory arrays, damage threshold values have even be attained of up to 5 MW/mm$^2$; an upward trend to 10 MW/mm$^2$ and more can be expected. The damage threshold value $I_{dam}$ of the fiber bundle means the maximum intensity at which the input coupling end of the fiber bundle can be exposed to radiation without damage to the fiber bundle. Moreover, $I_{dam}$ is to be smaller than the intensity (threshold value) from which undesirable nonlinear optical effects can be expected in the fiber bundle. This is the case under practical conditions. The damage threshold value depends on the materials employed and on the way in which the fibers or the end faces of the fiber bundles are combined and machined.

High damage threshold values can be obtained for the fiber bundles by an expensive processing operation: By polishing and optionally by coating of the fiber bundle ends, preferably with an antireflection layer, the damage threshold values can be considerably raised, for example. Soldered or welded fiber bundle ends lend themselves well to polishing and coating on account of their good homogeneity of material. The cost of treating the fiber bundle ends in conjunction with the cost of the material are a governing determinant for the price of the fiber bundles.

It is known, for example, from German Patent No. 2,630,730, how to extensively eliminate interspaces ("gussets") between the fibers at the end face. For this purpose, the end of the fiber bundle is heated and radially compressed.

It is also known, for instance, from German Patent No. 3,247,500, to fuse fiber bundle ends and thus render them heat resistant. For this purpose, the materials, utilized are selected so that the fiber bundle end exhibits a coefficient of thermal expansion which decreases from the outside toward the inside.

It is desirable to have a fiber bundle suitable for the transmission of high-power radiation, making it possible to transmit the radiation without substantial impairment of the beam quality, i.e., without a substantial enlargement of the beam product of the emitted radiation as compared to the received radiation, wherein, with the setting of a damage threshold value determined by the manufacturing expenditure, the amount of necessary material is to be minimized.

SUMMARY OF THE INVENTION

A process is provided for the transmission of electromagnetic radiation of high power through a flexible fiber bundle comprising a plurality of multimode single fibers consisting of core and cladding combined at the ends of the fiber bundle. The fiber bundle can be used for continuous or pulsed radiation with pulse durations of more than 1 μs with a luminous intensity of $10^5$W/(rad·mm)$^2$, and for pulsed laser beams having pulse durations of less than 1 μs with a luminous intensity of $10^6$W/(rad·mm)$^2$ to $8·10^{18}$W/(rad·mm)$^2$. The improvement comprises passing the electromagnetic radiation through a fiber bundle having:

(a) a cross-sectional area $A_b$ in mm$^2$ of (1 . . . 6)·P/$I_{dam}$ wherein P is the maximum radiant power (pulse peak power) in watts and $I_{dam}$ is the damage threshold value of the fiber bundle in W/mm$^2$, and (b) the numerical aperture NA of the fibers of the fiber bundle amounts to the maximum of the quotient $$\left( \frac{\theta(\phi) \cdot D(\phi)}{D_b(\phi)} \right) \text{multiplied by } (0.5 \ldots 1)$$

wherein $\theta(\phi)$ is the full angular divergence of the beam at the output of the radiation source in rad in dependence on the angle $\phi$ perpendicular to the beam axis; $D(\phi)$ is the chord and/or diameter of the beam passing through the apex of the angle $\phi$ in mm at the output of the radiation source in dependence on the angle $\phi$; $D_b(\phi)$ is the chord and/or diameter of the beam passing through the apex of the angle $\phi$ in mm at the input coupling end of the fiber bundle in dependence on the angle $\phi$, and the numerical aperture is no smaller than 0.05 and no larger than 0.35.

DETAILED DESCRIPTION

According to the present invention, transmission through fiber bundles of high-power radiation, such as in laser beams, can be effected, in the range of a luminous intensity of the radiation of $10^5$ W/(rad·mm)$^2$ to $1.6\cdot10^8$ W/(rad·mm)$^2$ with continuous or pulsed radiation of pulse durations of more than 1 μs, and in the range of $10^6$ W/(rad·mm)$^2$ to $8\cdot10^8$ W/(rad·mm)$^2$ with pulsed radiation of pulse durations of less than 1 μs, when the cross-sectional area $A_b$ in mm$^2$ of the fiber bundle amounts to $(1 \ldots 6)\cdot(P/I_{dam})$ wherein P is the maximum radiant power (pulse peak power) in watts and $I_{dam}$ is the damage threshold value of the fiber bundle in W/mm$^2$ for radiation in the respective spectral region and with the respective pulse duration. The cross-sectional area $A_b$ is, of course, understood to mean merely the portion of the fiber bundle effective for beam guidance, i.e. the irradiated portion. Parts of the fiber bundle not exposed to radiation are superfluous. The numerical aperture NA of the fiber bundle fibers is to be $(0.5 \ldots 1)$ multiplied by the maximum of the quotient $$\left( \frac{\theta(\phi)\cdot D(\phi)}{D_b(\phi)} \right)$$

wherein $\phi$ is the angle perpendicular to the beam axis, $\theta(\phi)$ is the full angular divergence of the radiation in rad at the output of the radiation source in dependence on $\phi$, $D(\phi)$ is the chord and/or diameter of the beam passing through the apex of angle $\phi$ in mm at the output of the radiation source in dependence on $\phi$, and $D_b(\phi)$ is the chord and/or diameter of the beam passing through the apex of the angle $\phi$ in mm at the input coupling end of the fiber bundle in dependence on this angle $\phi$. The numerical aperture, however, is not to become smaller than 0.05 since in such a case excessive radiation losses (microcurvature losses) occur, and it is not to become larger than 0.35 since in such a case the transmission of the desired power is hardly possible any more. The range from 0.24 to 0.35 for the numerical aperture is obtainable only by strong doping of the (SiO$_2$) core. However, this leads, inter alia, to low threshold values for nonlinear optical effects so that this range is usable only in the lower claimed power range of the radiation. The range of 0.07–0.18 is preferred, more preferably 0.07–0.13, for the numerical aperture since in this range, at negligibly small microcurvature losses, fiber bundles become feasible having lower damage threshold values than in the range from 0.18 to 0.35. The use of these low values for the numerical aperture is surprising, in particular, because in the conventional fiber bundles for image and signal transmission, a maximally large numerical aperture has been aimed for in all cases for the fibers.

For beams having approximately rotationally symmetrical beam profiles with respect to the beam axis and approximately rotationally symmetrical angular distributions of the radiation, the formula for the numerical aperture NA of the fibers is simplified because said quotient $$\left( \frac{\theta(\phi)\cdot D(\phi)}{D_b(\phi)} \right)$$

is constant, i.e. independent of the angle $\phi$. Since the beam profile at the input coupling end of the fiber bundle is circular, the relationship $$D_b = \left( \frac{4}{\pi}\cdot A_b \right)^{\frac{1}{2}} = 1.13\cdot A_b^{\frac{1}{2}}$$

applies therein between the cross-sectional area of the beam $A_b$ in mm$^2$ and the diameter of the beam $D_b$ in mm. Thus, the numerical aperture of the fibers of the fiber bundle is calculated to be $(0.44 \ldots 0.89)\cdot\theta\cdot D/A_b^{\frac{1}{2}}$ wherein $\theta$ means the full angular divergence of the radiation in rad at the output of the radiation source, D means the diameter of the beam in mm at the output of the radiation source, and $A_b$ means the calculated cross-sectional area of the fiber bundle in mm$^2$.

If the beam exhibits, at the output of the radiation source, different angular distributions in various directions perpendicular to the beam axis, i.e. if the angular distribution of the radiation is not rotationally symmetrical, then under certain circumstances the numerical aperture of the fiber bundle is determined by the maximum divergence of the radiation (in dependence on the spatial direction perpendicular to the beam axis). In such a case, the transmission can reduce the quality of the radiation with respect to the direction having minimum divergence. For this reason, the beam to be coupled into the fiber bundle is preferably transformed by means of suitable optical systems (e.g. with an amorphic optics and/or cylindrical lenses) in such a way that radiation can be coupled into the fiber bundle having an angular distribution that is approximately rotationally symmetrical to the beam axis. This is done at the possible cost of tolerating that the beam to be coupled into the fiber bundle has a noncircular beam profile.

The fiber bundle is to consist of fibers having essentially the same core diameter $D_k$. The core diameter is preferably to be of such a size that the fibers can still just be bent, without problems, with the desired radius of bending R, i.e. the core diameter of the fibers is to be maximally large. This ensures that also the outer diameter of the fibers becomes a maximum, and the number of fibers necessary for the fiber bundle is at a minimum. By minimizing the number of fibers in the fiber bundle, a good mechanical strength of the individual fibers is attained, along with a considerable simplification in the production of the fiber bundle. This requirement is attained if the core diameter $D_k$ in mm is determined in accordance with the formula $D_k = NA^2\cdot b\cdot R$ wherein NA is the numerical aperture, R is the desired minimum bending radius for the individual fiber in mm, and b is a constant with values of between 0.03 and 0.24, preferably between 0.06 and 0.18.

It is also advantageous to optimize the thickness of the cladding for the fibers. In order to ensure secure beam guidance, the thickness in mm of the cladding, which latter can optionally consist of several cladding layers, should be larger than $0.05\cdot\lambda/NA$ wherein NA is the numerical aperture of the fiber and $\lambda$ is the wavelength of the radiation to be transmitted in mm. A thickness of the cladding greater than 0.05 mm is generally not required. Such greater thickness does not make a positive contribution to beam guidance but rather leads merely to a reduction in the bending radius of the fiber. The relatively wide range for the cladding thickness results from the fact that the thickness of the fiber cladding also depends on the properties displayed by the environment of the fibers (e.g. cooling media), the extent to which the fibers are bent, and the regularity with which they are located in the bundle.

The fibers can lie loosely in the fiber bundle if their diameter is large and thus their tensile strength and flexural stiffness are adequately high to exclude breakage of the fibers in the fiber bundle. Fiber bundles in this type of arrangement can be manufactured in the simplest way. Another advantage of this type of arrangement resides in that the fibers of the fiber bundle lend themselves well to cooling. In this arrangement, to ensure secure beam guidance, the thickness in mm of the fiber cladding should be larger than $0.1 \lambda/NA$ wherein NA is the numerical aperture of the fiber and $\lambda$ is the wavelength of the radiation to be transmitted in mm.

In case of fibers disposed loosely in the fiber bundle, great microcurvature losses can occur, especially if the numerical aperture and/or the flexural stiffness of the fibers is small. In such cases, it may be advantageous to guide the fibers within the fiber bundle with suitable means. Devices for guiding optical fibers in a fiber bundle pertain to the state of the art. Preferably, the fiber bundle is to be fused along its entire length. In this embodiment, the fused fiber bundle can be utilized if the cross-sectional area $A_b$ of the fiber bundle is smaller than about 4 mm$^2$, otherwise the bending stiffness of the fiber bundle becomes too high for technical applications. In a fused fiber bundle, the fibers support one another whereby bending of the fibers leading to microcurvature losses is reduced. A further advantage of this embodiment resides in that an additional beam guidance effect results from the tight packing of the fibers in a fused fiber bundle: Radiation leaving a fiber of the fiber bundle can be trapped by one of the neighboring fibers. If such "crossover coupling" of radiation occurs between the fibers, the quality of the transmitted radiation may be slightly impaired, but there is no loss, or only a negligible partial loss, of radiation. Therefore, in this embodiment minimum values are necessary for the thickness of the fiber cladding. The methods for producing fused fiber bundles are known in the art.

It is furthermore conventional to surround the fibers of the fiber bundle with a joint protective sheath. It is further possible for the protective sheath or the fiber bundle to contain components for cooling the fibers or fiber bundle as well. Preferably, coolant ducts are involved here which extend substantially in parallel to the fibers and have satisfactory thermal (heat-conductive) contact with the fibers or wherein satisfactory thermal (heat-transfer) contact with the fibers is produced by a suitable transfer medium, for example by allowing a cooling medium to flow through the fiber bundle. The protective sheath can furthermore contain additional components ensuring the intended and safe operation of the bundle. These components can preferably involve leakage radiation detectors responding to the radiation released upon a possible breakage of fibers. Alternatively, electrical or optical signal lines can be involved, by means of which, for example, suitable devices at the radiation source permit emission of radiation only in case the fiber couplings are in proper condition.

Each fiber connects an input coupling end of the fiber bundle with an output coupling end. At the ends, the fibers are suitably combined in a manner known per se; they are preferably soldered or welded together. The fiber bundle end is generally encased additionally in a sheath of metal or glass Combining of fibers at the end faces of fiber bundles pertains to the state of the art.

One disadvantage of the conventional methods for treating the end faces resides in that, in case of fiber bundles made up of many or thin fibers, the fibers are disposed at the input coupling end always somewhat irregularly and consequently radiant losses are incurred. The losses can be reduced if the fibers are individually placed prior to combining the fiber bundle end, and their position is controlled during the combining step. This is possible at tolerable expenditure only if merely a few and thick fibers are utilized. For this reason, maximally thick fibers are to be used for the fiber bundles.

Another substantial drawback of the known methods for treating the fiber bundle ends resides in that the proportion of the core area to the total cross-sectional area of the fibers remains essentially constant toward the input coupling end of the fiber bundle If the fiber end faces at the input coupling end are exposed uniformly to radiation, then only the proportion of radiation impinging on the cross-sectional surface area of the cores is captured and passed on; the proportion of radiation impinging on the cross-sectional area of the claddings, called input coupling loss, is converted into thermal energy and can lead to damage to the fiber bundle. If evolution of heat becomes too 8rear. the input coupling end can be cooled, but it is especially advantageous to rid the fibers at their input coupling end entirely or partially of their cladding. This cladding removal can also be advantageous at the output coupling end.

The cladding is preferably removed by etching prior to combining the fiber bundle ends. The processes of removing the material from the fiber claddings by etching pertain to the state of the art. The special advantage in these processes is that a fiber cladding can be etched in a controlled fashion in a conical configuration, and that in this way a $\mp$softer", i.e. more loss-free transition can be produced at the input coupling end. A slight etching of the core cannot always be avoided in this procedure.

Another suitable method for eliminating material of the fiber claddings at the input coupling end of the fiber bundle resides in selecting the material for the fiber cores and the fiber claddings in such a way that the material of the fiber claddings softens at an earlier point in time than that of the fiber cores. During combining of the fiber bundle ends, the fibers are then heated to an appropriate extent, and the fiber bundle end is compressed radially so that the material of the fiber claddings is squeezed out of the fiber bundle end. On this occasion, a plastic deformation of the fiber ends along the lines of a denser packing per unit area can likewise be effected. The deformation of the fiber core, however, must not go so far that the cross-sectional area of the fiber core is diminished.

Even radiation having a noncircular beam profile can be coupled into a fiber bundle having the aforedescribed features and transmitted, by a corresponding design of the input coupling end. However, if a fiber bundle with a round cross section of the input coupling end is to be utilized for the transmission of radiation having, for example, a rectangular or elliptical profile, this will be at the cost of having to expend a larger amount of material for the manufacture of the fiber bundle than is necessary. Therefore, in a way described hereinbelow, the cross-sectional profile of the input coupling ends is to be preferably shaped in correspondence with the beam profile of the radiation to be coupled in.

With the aid of the fiber bundles, it is likewise possible to bring about a change in the aperture in a very simple way, i.e. it is readily possible to generate, at the radiation outlet, a cross-sectional profile different from that at the radiation inlet. The aperture modification is attained by shaping the cross-sectional profile of the fiber bundle input coupling ends in correspondence with the beam profile of the radiation to be coupled in and/or by shaping the cross section of the fiber bundle output coupling ends in correspondence with the requirements of the consumers. For this purpose, the fibers at the fiber bundle ends are to be placed, prior to being combined and/or soldered or welded together, in correspondence with the desired geometrical configuration of the end and/or the heated and softened fibers at the end are to be pressed into the desired geometrical form during the soldering or welding operation.

Aperture modification is furthermore attained by redistributing the fibers in the fiber bundle in one of the ways described below. In case a radiation source emits with an inhomogeneous beam profile, and a profile having the intensity maximum in the beam center is necessary for the practical applications, then the fibers emanating from locations of the input coupling end having high values for radiation intensity are to terminate at the output coupling end at locations close to the center; and the fibers emanating from sites having low values for intensity are to end at the outputcoupling end at points close to the rim. In case a radiation source emits radiation having an inhomogeneous beam profile, and a maximally uniform intensity is required for the practical applications, then fibers emanating from points at the input end having high radiation intensity, and fibers emanating from a point of low intensity, are to be uniformly distributed at the output end. If a radiation source emits radiation having an approximately homogeneous beam profile, and an inhomogeneous profile with the intensity maximum in the beam center is needed for practical applications, then the fibers of the fiber bundle can be placed at the output coupling end with a location-dependent density wherein the density of the fibers decreases toward the rim of the output coupling end, the position of the fibers at the output coupling end being fixed by spacer elements. A variation of the last example resides in that the spacer elements consist of materials, especially of fibers (filler fibers) which can be soldered or welded together with the fibers of the fiber bundle. These so-called filler fibers can serve for monitoring the radiant flux, the condition, or adjustment of the components on the output coupling side, for example by trapping a portion of the radiation scattered back at the output coupling side and by introducing this radiation into detectors and analyzers. The filler fibers can also serve for feeding electromagnetic radiation of low power, preferably within the visible spectral zone, to the output coupling end of the fiber bundle, by means of which the condition or adjustment of the components on the output coupling side can be investigated.

Multiplexing on the input coupling side is achieved by joining several fiber bundles with separate input coupling ends into a combined bundle wherein the radiation of separate radiation sources is combined at the input coupling ends of the fiber bundles. The advantages of this arrangement reside in that a higher radiant power is available in the joined fiber bundle than the power that a single radiation source is capable of emitting; that with radiation sources operating in pulsed mode a higher radiant power is available in the combined fiber bundle averaged over time than a single radiation source is capable of emitting; or that, in case of radiation sources operating in pulsed fashion with a lower repetition rate (recurrence rate) in the combined fiber bundle, a higher pulse frequency of the radiation prevails and consequently a higher operating speed is possible in certain practical applications. In case of an outage of radiation sources due to disturbance or servicing, the multiplexing feature can ensure the functional efficiency of the total system: At an adequately high number of radiation sources, the radiant output in the combined fiber bundle will drop, upon a failure of a radiation source, only in correspondence with the proportion of the radiation source with respect to the total radiation.

Multiplexing on the output coupling side is obtained by subdividing a fiber bundle into several small fiber bundles or fibers leading to separate consumers. One advantage of this arrangement is that the radiation from one or several high-power radiation sources can simultaneously supply several consumers and thus improved exploitation of the radiation sources is possible.

A bilateral multiplexing (input and output coupling sides) is obtained by combining several initially separate fiber bundles provided with radiation sources at their input coupling ends, into a fiber bundle which is again separated into several fiber bundles or individual fibers leading to the separate consumers at the output coupling ends. One advantage of this arrangement is, for example, that in case of a failure of radiation sources due to disturbance or servicing, the functional status of the total system is ensured: With an adequately high number of radiation sources, the radiant power at an output coupling end will drop only insubstantially upon the inactivation of a radiation source.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following example, all temperatures are set forth uncorrected in degrees Celsius; and, unless otherwise indicated, all parts and percentages are by weight.

The entire texts of all applications, patents and publications, cited above and below, and of corresponding West German Application No. P. 38 35 325, filed Oct. 17, 1988, are hereby incorporated by reference.

EXAMPLE

The radiation of a copper vapor laser (wavelengths at 511 and 578 nm) is to be transmitted. The laser has a median power of about 100 W, a round beam profile, an angular distribution of the radiation which is rotationally symmetrical to the beam axis, and a beam quality (beam product) of about 0.1 rad·mm. The repetition rate of the laser is about 6 kHz, and the pulse duration is about 20 ns; thus, approximately 1 MW can be calculated for the peak output P, and about $L \approx 10^8 \text{W}/(\text{mrad}\cdot\text{mm})^2$ can be calculated for the luminous intensity. The fiber bundle is to have a minimum bending radius R of 100 mm.

For transmitting this radiation, only a fiber bundle having a high damage threshold value can be utilized. A fiber bundle is to be used which has a damage threshold value of 3 MW/mm² by an appropriate choice of the fiber materials (high-purity silica glass) and treatment of the input coupling end (welding together of the fibers, polishing, and antireflection coating). The cross-sectional area $A_b$ of the fiber bundle in mm² is calculated according to the formula $A_b = 1.3\,(P/I_{dam})$ to be 0.43 mm². The factor 1.3 was selected in place of the upper limit of 1.0 in order to increase the tolerances during adjustment of the fiber bundle. The numerical aperture NA is calculated in accordance with $NA = 0.51\cdot(\theta\cdot D)/A_b^{\frac{1}{2}}$ to be 0.078. According to $D_k = NA^2\cdot b\cdot R$ wherein $b = 0.12$, a diameter of 0.073 mm is obtained for the core diameter $D_k$, and a thickness of 0.0015 mm is calculated for the cladding thickness in accordance with $0.2\cdot\lambda/NA$ for $\lambda = 578$ nm; for safety reasons, a thickness of 0.002 mm is utilized. From this, a total diameter $D_m$ of a single fiber is determined to be 0.077 mm. The number of fibers in the fiber bundle is thus calculated to be about 90. With such a low number the fibers can even be manually prepared and hand-laid. The input coupling efficiency, i.e. the proportion of radiation entering the fiber bundle end that is captured by the cores is about 0.90 in accordance with the formula $(D_k/D_m)^2$, i.e. about 10%, that is 10 W of the radiant power is lost during the coupling process in the fiber claddings. With a good antireflection property of the fiber bundle end, neglecting the radiation attenuation in the fiber material (in case of SiO₂ fibers in the respective spectral range about 20 dB/km), an input coupling efficiency of about up to 90% can be attained. If the fiber claddings are removed by conical etching in a length of about 0.5 to 2 cm at the fiber end, then the input coupling efficiency is enhanced whereby the transmission efficiency can rise to up to 99%.

The preceding example can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A flexible fiber bundle comprising a plurality of multimode single fibers having a core and cladding and combined at the ends of the fiber bundle, for high-energy transmission of continuous or pulsed electromagnetic radiation with pulse durations of more than 1 μs and a luminous intensity of from $10^5$ W/(rad·mm)² to $1.6\cdot 10^8$ W/(rad·mm)², and for pulsed laser beams having pulse durations of less than 1 μs with a luminous intensity of $10^6$ W/(rad·mm)² to $8\cdot 10^8$ W/(rad·mm)², said fiber bundle having:
   (a) a cross-sectional area $A_b$ in mm² of $(1\ldots 6)\cdot P/I_{dam}$, wherein P is the maximum radiant power (pulse peak power) in watts and $I_{dam}$ is the damage threshold value of the fiber bundle in W/mm², and
   (b) the numerical aperture NA of the fibers in the fiber bundle amounts to the maximum of the quotient of $$\left(\frac{\theta(\phi)\cdot D(\phi)}{D_b(\phi)}\right)\text{multiplied by } (0.5\ldots 1)$$

wherein $\theta(\phi)$ is the full angular divergence of the beam at the output of the radiation source in rad in dependence on the angle $\phi$ perpendicular to the beam axis; $D(\phi)$ is the chord and/or diameter of the beam passing through the apex of the angle $\phi$ in mm at the output of the radiation source in dependence on the angle $\phi$; $D_b(\phi)$ is the chord and/or diameter of the beam passing through the apex of the angle $\phi$ in mm at the input coupling end of the fiber bundle in dependence on the angle $\phi$, and the numerical aperture is no smaller than 0.05 and no larger than 0.35, and
   (c) the core diameter of the fibers of the fiber bundle is $D_k = NA^2\cdot b\cdot R$, NA meaning the numerical aperture, R meaning the required minimum bending radius in mm, and b meaning a constant having values from 0.03 to 0.24 but being larger than $0.8\cdot\lambda/NA$ wherein $\lambda$ is the wavelength of the radiation to be transmitted in mm, and NA means the numerical aperture of the fibers.

2. A flexible fiber bundle comprising a plurality of multimode single fibers having a core and cladding and combined at the ends of the fiber bundle, for high-energy transmission of continuous or pulsed electromagnetic radiation with pulse durations of more than 1 μs and a luminous intensity of from $10^5$ W/(rad·mm)² to $1.6\cdot 10^8$ W/(rad·mm)², and for pulsed laser beams having pulse durations of less than 1 μs with a luminous intensity of $10^6$ W/(rad·mm)² to $8\cdot 10^8$ W/(rad·mm)², said fiber bundle having:
   (a) a cross-sectional area $A_b$ in mm² of $(1\ldots 6)\cdot P/I_{dam}$, wherein P is the maximum radiant power (pulse peak power) in watts and $I_{dam}$ is the damage threshold value of the fiber bundle in W/mm², and
   (b) the numerical aperture NA of the fibers in the fiber bundle amounts to the maximum of the quotient of $$\left(\frac{\theta(\phi)\cdot D(\phi)}{D_b(\phi)}\right)\text{multiplied by } (0.5\ldots 1)$$

wherein $\theta(\phi)$ is the full angular divergence of the beam at the output of the radiation source in rad in dependence on the angle $\phi$ perpendicular to the beam axis; $D(\phi)$ is the chord and/or diameter of the beam passing through the apex of the angle $\phi$ in mm at the output of the radiation source in dependence on the angle $\phi$; $D_b(\phi)$ is the chord and/or diameter of the beam passing through the apex of the angle $\phi$ in mm at the input coupling end of the fiber bundle in dependence on the angle $\phi$, and the numerical aperture is no smaller than 0.05 and no larger than 0.35.

3. A fiber bundle according to claim 2 wherein the numerical aperture is between 0.07 and 0.18.

4. A fiber bundle according to claim 2, wherein the thickness in mm of the cladding of the fibers is larger than $0.05\cdot\lambda/NA$ but smaller than 0.05 mm, wherein $\lambda$ means the wavelength of the radiation to be transmitted in mm, and NA means the numerical aperture of the fibers.

5. A fiber bundle according to claim 2, wherein the fibers of the fiber bundle are entirely of partially freed of their cladding at the input coupling end and, optionally, at the output coupling end.

6. A fiber bundle according to claim 2, wherein the fibers are fused together over their entire length.

7. A fiber bundle according to claim 2, wherein the numerical aperture of the fiber bundle, for rotationally symmetrical beams, is between $0.44 \cdot (\theta \cdot D)/A_b^{\frac{1}{2}}$ and $0.89 \cdot (\theta \cdot D)/A_b^{\frac{1}{2}}$.

8. In a process for transmission of high-power, electromagnetic radiation through a flexible fiber bundle comprising a plurality of multimode single fibers having a core and cladding and combined at the ends of the fiber bundle, for continuous or pulsed radiation with pulse durations of more than 1 μs and a luminous intensity of from $10^5$ W/(rad·mm)$^2$ to $1.6 \cdot 10^8$ W/(rad·mm)$^2$, and for pulsed laser beams having pulse durations of less than 1 μs with a luminous intensity of $10^6$ W/(rad·mm)$^2$ to $8 \cdot 10^8$ W/(rad·mm)$^2$, the improvement comprising passing said radiation through a flexible fiber bundle having:

(a) a cross-sectional area $A_b$ in mm$^2$ of $(1 \ldots 6) \cdot P/I_{dam}$, wherein P is the maximum radiant power (pulse peak power) in watts and $I_{dam}$ is the damage threshold value of the fiber bundle in W/mm$^2$, (b) the numerical aperture NA of the fibers in the fiber bundle amounts to the maximum of the quotient of $$\left( \frac{\theta(\phi) \cdot D(\phi)}{D_b(\phi)} \right) \text{multiplied by } (0.5 \ldots 1)$$

wherein $\theta(\phi)$ is the full angular divergence of the beam at the output of the radiation source in rad in dependence on the angle $\phi$ perpendicular to the beam axis; $D(\phi)$ is the chord and/or diameter of the beam passing through the apex of the angle $\phi$ in mm at the output of the radiation source in dependence on the angle $\phi$; $D_b(\phi)$ is the chord and/or diameter of the beam passing through the apex of the angle $\phi$ in mm at the input coupling end of the fiber bundle in dependence on the angle $\phi$, and the numerical aperture is no smaller than 0.05 and no larger than 0.35, and (c) the core diameter of the fibers of the fiber bundle is $D_k = NA^2 \cdot b \cdot R$, NA meaning the numerical aperture, R meaning the required minimum bending radius in mm, and b meaning a constant having values from 0.03 to 0.24 but being larger than $0.8 \cdot \lambda/NA$ wherein $\lambda$ is the wavelength of the radiation to be transmitted in mm, and NA means the numerical aperture of the fibers.

9. The process of claim 8, wherein the fiber bundle consists of fibers having essentially the same core diameter.

10. In a process for transmission of high-power, electromagnetic radiation through a flexible fiber bundle comprising a plurality of multimode single fibers having a core and cladding and combined at the ends of the fiber bundle, for continuous or pulsed radiation with pulse durations of more than 1 μs and a luminous intensity of from $10^5$ W/(rad·mm)$^2$ to $1.6 \cdot 10^8$ W/(rad·mm)$^2$, and for pulsed laser beams having pulse durations of less than 1 μs with a luminous intensity of $10^6$ W/(rad·mm)$^2$ to $8 \cdot 10^8$ W/(rad·mm)$^2$, the improvement comprising passing said radiation through a flexible fiber bundle having:

(a) a cross-sectional area $A_b$ in mm$^2$ of $(1 \ldots 6) \cdot P/I_{dam}$, wherein P is the maximum radiant power (pulse peak power) in watts and $I_{dam}$ is the damage threshold value of the fiber bundle in W/mm$^2$, and (b) the numerical aperture NA of the fibers in the fiber bundle amounts to the maximum of the quotient $$\left( \frac{\theta(\phi) \cdot D(\phi)}{D_b(\phi)} \right) \text{multiplied by } (0.5 \ldots 1)$$

wherein $\theta(\phi)$ is the full angular divergence of the beam at the output of the radiation source in rad in dependence on the angle $\phi$ perpendicular to the beam axis; $D(\phi)$ is the chord and/or diameter of the beam passing through the apex of the angle $\phi$ in mm at the output of the radiation source in dependence on the angle $\phi$; $D_b(\phi)$ is the chord and/or diameter of the beam passing through the apex of the angle $\phi$ in mm at the input coupling end of the fiber bundle in dependence on the angle $\phi$, and the numerical aperture is no smaller than 0.05 and no larger than 0.35.

11. The process of claim 10, wherein the numerical aperture is between 0.07 to 0.18.

12. The process of claim 10, wherein the thickness in mm of the cladding of the fibers is larger than $0.05 \cdot \lambda/NA$ but smaller than 0.05 mm, wherein $\lambda$ means the wavelength of the radiation to be transmitted in nm, and NA means the numerical aperture of the fibers.

13. The process of claim 10, wherein the fibers of the fiber bundle are entirely or partially freed of their cladding at the input coupling end and, optionally, at the output coupling end.

14. The process of claim 10, wherein the fibers are fused together over their entire length.

15. The process of claim 10, wherein the numerical aperture of the fiber bundle, for rotationally symmetrical bases, is between $0.44 \cdot (\theta \cdot D/A_b^{\frac{1}{2}})$ and $0.89 \cdot (\theta \cdot D) A_b^{\frac{1}{2}}$.

16. The process of claim 10 wherein the fibers lie loosely in the fiber bundle, and the thickness in mm of the fiber cladding is larger than $0.1 \cdot \lambda/NA$, wherein NA is the numerical aperture of the fiber and $\lambda$ is the wavelength of the radiation being transmitted.

17. The process of claim 14, wherein the cross-sectional area $A_b$ of the fiber bundle is smaller than about 4 mm$^2$.

18. The process of claim 10, wherein the fiber bundle is surrounded by a protective sheath.

19. The process of claim 10, wherein the fiber bundle is cooled.

20. The process of claim 10, wherein the cross-sectional profile of the input coupling end of the fiber bundle corresponds to the shape of the beam profile of the electromagnetic radiation being coupled in.

21. The process of claim 10, wherein the aperture of the beam is modified by redistributing the fibers in the fiber bundle, with the position of the fibers in the input coupling end differing from their respective position in the output coupling end.

22. The process of claim 21, wherein the fiber bundle contains filler fibers at its output coupling end.

23. The process of claim 10, wherein several sources of high energy electromagnetic radiation are transmitted together over a multiplexed system by passing the sources of radiation into the input end of a plurality of fiber bundles having their input coupling ends joined into a single bundle.

24. The process of claim 10, wherein the electromagnetic radiation transmitted in the fiber bundle is divided in a multiplexed system on the output coupling end by subdivision of the fiber bundle into several smaller fiber bundles or fibers.

25. The process of claim 10, wherein said electromagnetic radiation is transmitted through a bilateral multiplexing system containing at least one of said flexible fiber bundles.

26. The process of claim 10, wherein the electromagnetic radiation is a laser.

* * * * *